March 5, 1968 — E. J. SMITH — 3,371,788
WASTE TREATING APPARATUS
Filed June 29, 1965
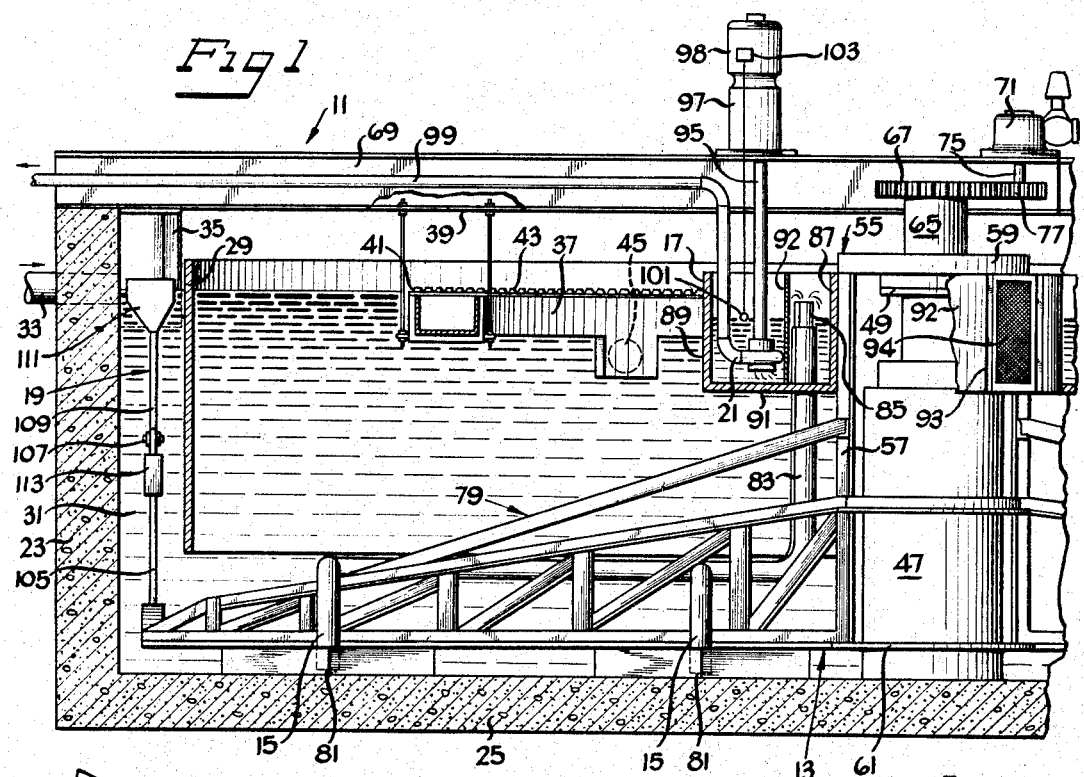
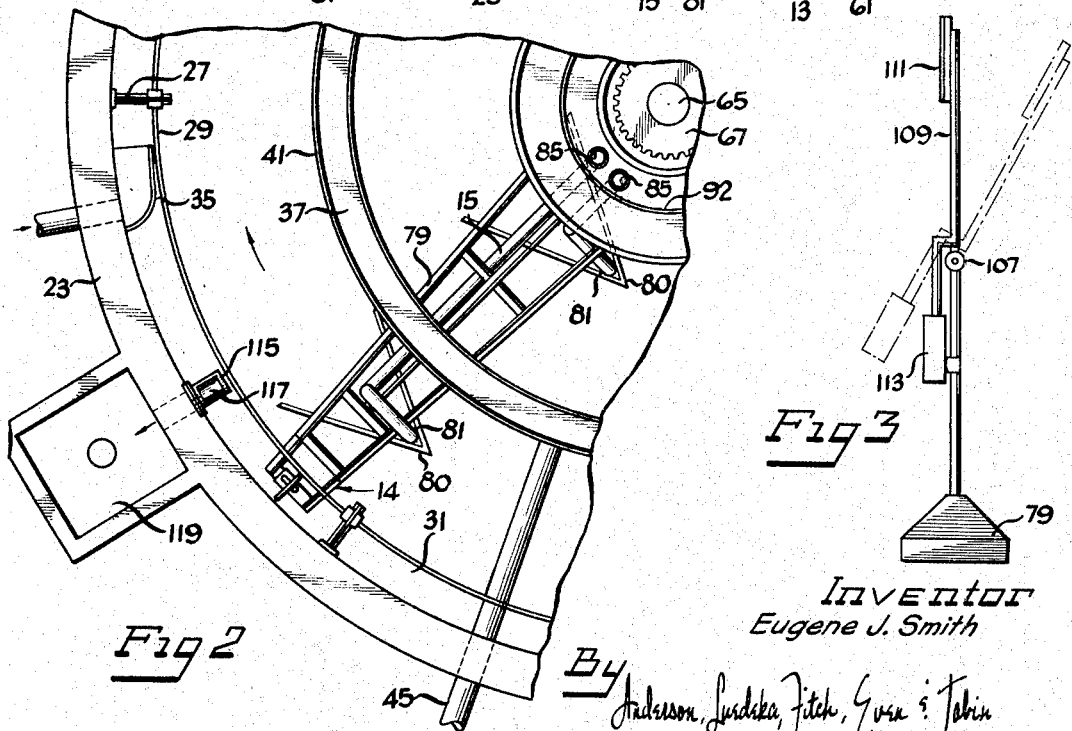
Inventor
Eugene J. Smith
By Anderson, Luedeka, Fitch, Even & Tabin
Atty's United States Patent Office 3,371,788
Patented Mar. 5, 1968

3,371,788
WASTE TREATING APPARATUS
Eugene J. Smith, Storms Road,
Valley Cottage, N.Y. 10989
Filed June 29, 1965, Ser. No. 468,025
2 Claims. (Cl. 210—121)

ABSTRACT OF THE DISCLOSURE

A waste treatment clarifier having a peripheral raceway inlet and a flat bottom. A sludge-sweeping arm is rotatively supported from a central pier with the arm carrying a plurality of V-shaped plows. A conduit extends from the apex of each plow to a basin located below the fluid level of the clarifier to conduct fluid and sludge from each plow to the basin. The flow through each conduit is adjustable. The fluid from the basin is pumped intermittently to a treatment means. A pivotal scum-skimmer is supported adjacent the end of the sludge-sweeping arm which skimmer rides in the raceway and moves scum to an outlet therein.

---

This invention relates to sewage treatment apparatus. More specifically, it relates to sewage treatment clarifier tanks for use in known sewage treatment processes.

In processing sewage, sludge removal from the sewage is often accomplished by passing the sewage through a group of settling or clarifier tanks. These tanks are generally cylindrical or rectangular in shape and are provided with a bottom which tapers downwardly from the outer periphery toward a centrally positioned sludge collector which is provided with a sludge discharge outlet through which the sludge is removed from the tank. Sewage is continuously admitted into the tank, and the sludge settles to the bottom.

In known clarifiers, rotating sludge scrapers, which are provided with scraper blades, move sludge on the bottom of the tank toward the central sludge collector. The de-sludge effluent is continuously removed from the tank near the upper end, usually through the utilization of an overflow weir, and is transferred to other apparatus for further processing.

Certain difficulties have been encountered in sludge removal operations. Fluid motion within the tank has a pronounced effect on the settling activity within the tank, and in certain clarifier tanks, such as, for example, the final tank of a series of tanks, the sludge that is present may be a very light floc which is difficult to remove. Difficulty is also encountered in effecting rapid removal of either light or dense floc or sludge from the bottom of clarifiers.

Accordingly, it is the principal object of the present invention to provide an improved clarifier.

It is a further object of the present invention to provide a clarifier which rapidly removes sludge.

It is a still further object of the present invention to provide a clarifier tank in which sludge is removed from the tank by means of a fluid level differential as distinguished from a syphoning action.

It is another object of the present invention to provide a clarifier which may have a generally horizontally disposed bottom.

It is an additional object of the present invention to provide a clarifier wherein sludge is discharged from the top of the tank.

It is a still further object of the present invention to provide a clarifier which facilitates removal of scum from the surface of the fluid.

Other objects and advantages in the invention will become apparent with reference to the following description and the accompanying drawings wherein:

FIGURE 1 is a fragmentary elevational view, partially in section, showing a half bridge clarifier having a perihperal race and embodying various features of the present invention;

FIGURE 2 is a fragmentary plan view of the apparatus shown in FIGURE 1; and

FIGURE 3 is an enlarged fragmentary side view of a surface scum removal device illustrated in FIGURE 1.

Clarifiers in use today are of several types including those into which influent is peripherally fed and those into which influent is centrally fed. Such clarifiers may be provided with full bridges which extend wholly across the clarifier tank or half bridges which, as indicated, only extend to the central portion of the tank. When a full bridge clarifier is installed, i.e., the bridge extending completely across the tank, the separating mechanisms are supported or hung from the bridge. When a half bridge clarifier is installed, the inwardly extending bridge is supported on a pier disposed centrally of the tank, and this pier supports the operating mechanisms. The embodiment of the invention shown in the drawing is a peripherally fed, half bridge clarifier, but it should be understood that the invention is not limited to such a type of clarifier.

Very generally, in the illustrated embodiment of the present invention, there is provided an open-topped cylindrical settling tank 11, and a centrally supported rotatable sludge removal assembly 13 which includes a plow assembly 14 for accumulating sludge and a plurality of radially spaced sludge conduit lines 15 adapted to remove accumulated sludge from the basin and conduct it to an annular sludge well 17 disposed at an upper portion of the sludge removal assembly 13. The sludge removal assembly may further include a scum scraper assembly 19 adapted to aggregate floating scum into a mass for removal from the tank 11.

A stationary sludge pump 21 is disposed within the rotating sludge well 17 and is adapted to pump material at such a rate from the well as to establish a hydraulic head which results from the difference between the level of fluid in the tank 11 and the level in the well 17 thereby causing the sludge to enter the sludge removal lines 15 and travel to the sludge well 17. The pump 21 then removes the sludge externally of the tank. It is important to note that syphoning action is not involved and that sludge removal is effected by the head. Thus, problems of priming or maintaining a syphon are avoided.

More specifically, and as best seen in FIGURE 1, the settling tank 11 includes a vertically disposed cylindrical outer wall 23 of substantial height, preferably formed of concrete or the like, which is closed at the lowermost end by a generally horizontally disposed bottom 25 of similar material, thus forming an open-topped tank to accept influent sewage.

As pointed out, the illustrated embodiment is of a peripheral feed type clarifier so that, in the tank, there is a vertically disposed eccentrically positioned cylindrical baffle skirt 29 having a diameter somewhat smaller than the internal diameter of the outer wall 23. The skirt 29 is supported interiorly of the tank by brackets 27 and forms a raceway 31 of generally spiral configuration with the outer wall 23.

The baffle skirt 29 extends upwardly to a position above the fluid level in the tank 11 and downwardly to a position spaced above the bottom 25 a distance sufficient to allow passage thereunder of the revolving plow assembly 14 and also to provide communication between the raceway 31 and the central portion of the tank.

An influent pipe 33 adapted to deliver the sewage to be processed in the tank 11 passes through the outer wall 23 near its upper end, entering the raceway 31 in the region of the widest width thereof. At the terminus of the influent pipe 33, there is located a tangential baffle 35 which directs the incoming sewage at generally right angles into the faceway 31.

A weir ring 37 of generally U-shaped cross section, which has an outer diameter smaller than the diameter of the baffle skirt 29, is supported in the illustrated embodiment adjacent the top of the tank 11 in concentric relation to the outer wall 23. Support is provided by a pair of outrigger beams 39 which extend across the top of the tank and which are secured to the top of the wall 23. An outer and inner wall 41 of the weir ring 37 is provided with a serrated edge 43 over which the fluid within the tank spills, thus determining the fluid level within the tank 11. Of course, the edge of the weirs need not be serrated and may be a straight edge. An effluent pipe 45 is connected to the weir ring 37 and is adapted to carry the fluid received therein to other processing equipment (not shown).

By reason of the above described construction, the path of fluid flow within the tank 11 is generally spirally downwardly from the influent pipe 33 within the raceway 31 until the fluid enters the central portion of the tank. Thereafter, the flow is generally spirally upwardly to the edge 43 of the weir ring 37 where it spills over and flows out of the clarifier through the effluent pipe 45. This flow pattern results in a period of retention of the fluid within the basin sufficient to allow settling of contained sludge to the bottom 25 of the tank.

As shown in FIGURES 1 and 2, there is positioned centrally of the tank 11, a vertically extending pier 47 of circular cross section which extends from the bottom 25 to a positive above the fluid level in the tank. The pier 47 is preferably formed of concrete or similar material and is adapted to support the sludge removal assembly 13 for rotation within the tank, the illustrated embodiment comprising a clarifier of the half bridge type. A suitable thrust bearing 49 is provided at the upper end of the pier 47 to rotatively support the weight of the sludge removal assembly 13.

As best seen in FIGURE 1, the sludge removal assembly 13 includes a vertically extending central cage 55, disposed in surrounding relation to the vertical pier 47, which comprises a series of vertical members 57 disposed in spaced relation about the pier. These members 57 are secured at their upper ends to a horizontally disposed circular platform 59 having a diameter greater than the diameter of the pier. The platform is carried on the thrust bearing 49. The lower ends of the vertical members 57 are secured to a ring 61.

The platform 59 is fixedly connected to a central vertical shaft 65. A horizontal gear 67 is affixed to the upper end of the shaft and is positioned slightly above the plane of the upper end of the cylindrical outer wall 23 of the tank 11. The gear 67 lies between a pair of parallel bridge beams 69 which extend from the edge of the tank to the pier 47 and which are secured to the upper end of the wall 23 and to the pier. A drive motor 71, mounted on the bridge beams 69, has a vertical shaft 75 which carries, at its lower end, a drive gear 77. The drive gear 77 operatively engages the gear 67 and provides the power for rotation of the sludge removal assembly 13.

The sludge removal assembly 13 also includes a pair of radially extending, horizontally disposed trusses 79 adapted to support the plow assembly 14 and the sludge pickup conduits 15. The plow assembly 14 is generally known and various types are in use and, accordingly, it need not be further described herein.

The sludge pickup conduits 15 are secured to and rotatable with the central support member 55. The trusses 79 lie generally adjacent the bottom 25 of the tank 11 in generally parallel relation thereto and extend outwardly to points near the outer wall 23. The sludge pickup conduits 15, which are adapted to pick up sludge accumulated at the bottom of the tank 11, are secured to each of the trusses 79 spaced radially outward from the central support member 55.

The plow assembly 14 includes a plurality of V-shaped plows 80 which depend from the supporting trusses 79 and sweep the bottom of the tank 11 to accumulate sludge. The plows 80 open in the direction of rotation of the trusses 79. The sludge pickup conduits 15 are formed of cylindrical tubes having an open end 81 positioned above the bottom scrapers 25 of the tank 11 in close proximity thereto, but not in contact therewith. A pickup conduit 15 is positioned at about the apex of each of the V-shaped plows 80 to remove the sludge accumulated therein.

As best seen in FIGURE 1, the illustrated embodiment includes two such pickup conduits 15 supported on each truss member 79, although the number may be varied. The spacing of the plows 80 outward from the pier 47 is staggered on the different trusses 79 so that the four plows 80 sweep substantially the entire tank bottom 25.

The other end of each of the sludge pickup conduits 15 terminates in a vertical tube section 83 which extends upwardly adjacent the central support member 55 of the sludge removal assembly. The tubes section 83 extends upward into the sludge well 17 to which it is fixedly connected. Accordingly, the tube sections 83 rotate with the sludge well 17. A vertically adjustable pipe 85 is located telescopically within the upper end of each tube section 83. By adjustment of the pipe 85, different hydraulic heads may be established, thereby controlling the rate of sludge pick-up from the bottom of the clarifier through each conduit 15.

The sludge well 17 is of generally annular configuration and is secured to the rotatable central support member 55. The well 17 is located adjacent the upper end of the support member 55 and includes a generally cylindrical vertical inner wall 87 fastened to the central support member 55, a tubular vertical outer wall 89 having a diameter smaller than the inner diameter of the weir ring 37, and a horizontal annular bottom plate 91 to form an open-topped annular chamber for collecting the sludge. An intermediate tubular divider 92 separates the well 17 into two annular regions that are in fluid communication through ports 93.

As shown in FIGURE 1, the sludge pump 21, illustrated as a centrifugal pump, which is designed to remove sludge from the well 17, is fixedly positioned within the well 17 by a support tube 95. The pump 21 has an inlet adjacent the bottom of the well 17 below the level of the upper end of the vertical tube section 83. A removable screen 94 is disposed in each of the ports 93 in the divider 92. Thus, fluid from the upper end of the tube section 83 must pass through the screen 94 before reaching the pump inlet, whereby any rags, leaves or foreign material, which may enter the clarifier with the influent, are prevented from reaching the pump 21. The pump support tube 95 depends from a drive housing 97 which is secured to and supported by the bridge beams 69. The pump is driven by a motor 98 mounted atop the drive housing which is connected to the pump through a shaft (not shown) which extends through the drive housing 97 and the support tube 95.

A sludge discharge line 99 extends upward from the pump 21 to the bridge beam 69 and thereafter horizontally along the beams to a location externally of the tank 11 where the sludge is conducted for further processing.

In operation of the above-described apparatus to accomplish removal of accumulated sludge from the bottom of the tank 11, the drive motor 71 is energized to effect rotation of the central support member 55 including the plow assembly 14, the sludge pickup conduits 15 and the sludge well 17. The tank is filled with fluid or waste material to the level determined by the edge 43 of the weir ring 37. Because there is communcation between the central portion of the basin and the sludge well 17 through the open sludge pickup lines 15, the fluid level within the sludge well 17 seeks the same level as the fluid in the basin. However, the sludge pump 21 is actuated to pump fluid from the sludge well 17 so that the fluid level drops to a point below the upper end of each tube section 83 thus producing a difference in elevation between the fluid levels in the tank 11 and in the well 17. The head resulting from this difference in elevation of fluid levels causes a flow of fluid from the tank bottom 25 through the open ends 81 and upward through the conduits 15 into the well 17. By adjusting the pipes 85, the fluid head is regulated to establish the desired intensity of flow through each of the conduits 15. It is often desirable to control the flow through an inboard conduit 15 independently of the flow through a conduit position radially outboard of it on the truss 79.

To control the pump 21, a float 101 may be positioned in the sludge well 17 at a vertical location below the upper end of the tube section 83. The float 101 is connected with the motor 98 through a shut-off switch 103 and turns off the motor when the fluid in the well 17 drops to a level a predetermined distance below the open end of the vertical tube 83.

The plows 80 sweep along the bottom and cause the settled sludge to be accumulated in the apexes thereof. The upward flow through the sludge pickup conduits 15, the open ends 81 of which are located at the apexes, causes the accumulated sludge to be carried into the conduits 15 to the well 17. As stated above, adjustment of the pipes 85 regulates the flow velocity. As can be appreciated, the action so produced accomplishes rapid and effective sludge removal from the basin soon after it has settled. Moreover, removal of sludge in this manner is efficient whether the material being settled is a very fine light floc or a heavy sludge.

In addition to the sludge contained in the waste material entering the tank 11 through the influent pipe 33, it usually also contains some scum material which floats on the surface of fluid within the basin. Since the influent enters in the raceway 31, the scum is generally confined to the surface of the raceway. To remove the floating scum, the scum scraper 19, best seen in FIGURE 3, is provided. The scum scraper 19 moves the scum within the raceway causing it either to aggregate and thus sink or to move to a collector wherefrom it is withdrawn from the tank 11 as described hereinafter.

The scum scraper 19 includes a vertical support bracket 105 mounted at its lower end in the outermost end of one of the trusses 79. A scum scraper 19 may be, and preferably is, provided at the end of each of the trusses 79. The bracket 105 extends upward to a location approximately mid-way of the depth of the basin. A pivot arm 109 is connected to the top of the bracket 105 at the pivot 107. A scraper plate 111 is mounted at the upper end of the pivot arm 109 at a location where the plate 111 extends above the fluid level of the basin and substantially transversely across the width of the raceway 31. The pivot feature is provided to allow the plate 111 to pivot downward and pass under any obstacle within the raceway, such as the baffle 35. A counter-weight 113 on the pivot arm 109 normally maintains the arm 109 in a vertical position and returns it to such a position after passing an obstruction.

The floating scum which does not sink and is thus moved along by the plate 111 is directed into a scum removal pipe 115, shown in FIGURE 2, which extends through the outer wall 23 into the raceway 31 at approximately the fluid level of the tank. The scum removal pipe 115 includes manually rotatable end portions which provide an adjustable opening 117 through which scum enters the pipe 115. The floating scum is directed into the opening 117 as the scraper nears the scum removal pipe 115, thus effectively removing floating scum from the raceway 31. The pipe 115 leads to a scum box 119.

An improved clarifier is provided which effectively and rapidly removes settled sludge from waste material whether it is in the form of a light floc or a heavy sludge. The clarifier operates effectively with a flat rather than a conical tank bottom. Moreover, the clarifier utilizes the existing rotary movement of the sludge removal assembly to effectively clear floating sum from the raceway of a peripherally fed clarifier.

Various features of the invention are set forth in the following claims.

What is claimed is:

1. Waste treatment apparatus comprising means defining a tank of generally circular cross section, inlet and outlet means for supplying a sludge-containing fluid to said tank and maintaining a predetermined fluid level therein, a tubular baffle dividing the upper portion of said tank into a peripheral raceway and a central basin, said inlet emptying into said peripheral raceway, scum outlet means at about the predetermined fluid level in said raceway, a center pier in said tank, a sludge removal assembly rotatively mounted on said center pier, an annular chamber mounted on said rotative assembly, said chamber extending vertically from a location substantially below said predetermined level to a location thereabove, said rotative assembly carrying a plurality of V-shaped plow means for sweeping the bottom of said tank, said assembly including a conduit in association with each of said plow means, which conduit has a lower end disposed at about the apex of said V-shaped plow means and in close proximity to the bottom of said tank and which conduit has an upper end that extends into said chamber and terminates at a position below the predetermined level of fluid within said tank, said basin being in fluid communication with said chamber through each conduit, pipe means for independently adjusting the vertical height of said upper end of each conduit, pump means having an inlet in said chamber at a location below said upper end of each conduit, screening means disposed in said chamber and located where fluid exiting from the upper ends of said conduits must pass therethrough before reaching said pump inlet, means for automatically controlling said pump means to maintain the level of fluid in said chamber below the upper ends of said conduits, and scum removing means carried by said rotative assembly and disposed in said raceway, said scum removing means including a plate member, a pivotal arm on which said plate member is mounted and also including means biasing said pivotal arm to a position where said plate member extends above the predetermined level of fluid, whereby said plate member directs floating scum into said scum outlet means.

2. Waste treatment apparatus comprising means defining a tank of generally circular horizontal cross section, inlet and outlet means for supplying a sludge-containing fluid to said tank and maintaining a predetermined fluid level therein, means dividing the upper portion of said tank into a peripheral raceway and a central basin, said inlet emptying into said peripheral raceway, scum outlet means in said raceway at about said predetermined level, means defining a chamber within said central basin, a sludge removal assembly rotatively mounted centrally within said tank, said assembly including plow means for sweeping the bottom of said tank and also including a conduit in association with said plow means which conduit has a lower end disposed in close proximity to the bottom of said tank and an upper end that extends into said chamber to a position below the predetermined level of fluid within said tank, pump means in communication with said chamber for maintaining the level of fluid therein below said upper end of said conduit, and scum removing means carried by said rotative assembly and disposed in said raceway, said scum removing means including a plate member, a pivotal arm on which said plate member is mounted and also including means biasing said pivotal arm to a position where said plate member extends above the predetermined level of fluid.

(References on following page)

References Cited

UNITED STATES PATENTS

| | | | |
|---|---|---|---|
| 1,892,688 | 1/1933 | Keefer et al. | 210—525 |
| 2,295,982 | 9/1942 | Widman | 210—416 X |
| 2,661,094 | 12/1953 | Stewart | 210—523 X |
| 2,681,151 | 6/1954 | Coulter | 210—528 |
| 2,798,041 | 7/1957 | Thompson et al. | 210—512 X |
| 2,875,697 | 3/1959 | Fernstrum | 103—220 X |
| 3,166,502 | 1/1965 | Kelly | 210—528 |
| 3,206,036 | 9/1965 | Hawley | 210—460 |

SAMIH N. ZAHARNA, *Primary Examiner.*

REUBEN FRIEDMAN, *Examiner.*

J. DE CESARE, *Assistant Examiner.*